US012188485B2

(12) United States Patent
Diederich et al.

(10) Patent No.: US 12,188,485 B2
(45) Date of Patent: Jan. 7, 2025

(54) PUMP ASSEMBLY

(71) Applicant: KSB SE & Co. KGaA, Frankenthal (DE)

(72) Inventors: Ralf Diederich, Frankenthal (DE); Thomas Elsaesser, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 0 days.

(21) Appl. No.: 18/266,845

(22) PCT Filed: Nov. 15, 2021

(86) PCT No.: PCT/EP2021/081670
§ 371 (c)(1),
(2) Date: Jun. 13, 2023

(87) PCT Pub. No.: WO2022/128282
PCT Pub. Date: Jun. 23, 2022

(65) Prior Publication Data

US 2024/0102487 A1 Mar. 28, 2024

(30) Foreign Application Priority Data

Dec. 14, 2020 (DE) ..................... 10 2020 133 327.7

(51) Int. Cl.
*F04D 29/44* (2006.01)
*F04D 1/06* (2006.01)

(52) U.S. Cl.
CPC ............. *F04D 29/44* (2013.01); *F04D 1/066* (2013.01); *F05D 2240/14* (2013.01); *F05D 2250/294* (2013.01)

(58) Field of Classification Search
CPC ...... F04D 29/44; F04D 1/066; F05D 2240/14; F05D 2250/294
See application file for complete search history.

(56) References Cited

U.S. PATENT DOCUMENTS

| | | | | |
|---|---|---|---|---|
| 4,277,223 A * | 7/1981 | Nelson | F04D 17/125 415/214.1 |
| 6,343,913 B1 * | 2/2002 | Ohsaki | F04D 29/426 415/199.2 |

(Continued)

FOREIGN PATENT DOCUMENTS

| | | |
|---|---|---|
| DE | 199 27 135 A1 | 12/2000 |
| DE | 10 2019 001 882 A1 | 9/2020 |

(Continued)

OTHER PUBLICATIONS

International Search Report (PCT/ISA/210) issued in PCT Application No. PCT/EP2021/081670 dated Mar. 1, 2022 with English translation (4 pages).

(Continued)

*Primary Examiner* — Courtney D Heinle
*Assistant Examiner* — Andrew J Marien
(74) *Attorney, Agent, or Firm* — Crowell & Moring LLP

(57) ABSTRACT

A pump assembly with improved sealing includes an outer housing and an insert arranged therein. The insert includes a rotatable shaft and at least two pressure stages. Each pressure stage has a housing, an impeller, and a seal that separates a first pressure chamber from a second pressure chamber. At least one of the pressure stage housings includes a first casing part having a first region having an enlarged inner diameter and a second region having a reduced inner diameter, and a second casing part having at least one first portion having a reduced outer diameter and a second portion having an enlarged outer diameter. The first region surrounds the first portion and at least partially surrounds the second portion, such that an annular chamber is formed between the first casing part and the second part, with the annular chamber being connected to the second pressure chamber.

12 Claims, 6 Drawing Sheets

(56) References Cited

U.S. PATENT DOCUMENTS

| | | | | |
|---|---|---|---|---|
| 2002/0114713 | A1 | 8/2002 | Wang et al. | |
| 2015/0159669 | A1* | 6/2015 | Meuter | F16J 15/08 415/170.1 |
| 2022/0163037 | A1 | 5/2022 | Amann et al. | |

FOREIGN PATENT DOCUMENTS

| | | | |
|---|---|---|---|
| EP | 2 679 824 | A1 | 1/2014 |
| WO | WO 01/83996 | A1 | 11/2001 |
| WO | WO 2013/120549 | A1 | 8/2013 |

OTHER PUBLICATIONS

German-language Written Opinion (PCT/ISA/237) issued in PCT Application No. PCT/EP2021/081670 dated Mar. 1, 2022 (5 pages).

German-language Office Action issued in German Application No. 10 2020 133 327.7 dated Oct. 6, 2021 (12 pages).

* cited by examiner

PUMP ASSEMBLY

CROSS REFERENCE TO RELATED APPLICATION

This application claims priority under 35 U.S.C. § 119 from German Patent Application No. 102020133327.7, filed Dec. 14, 2020, the entire disclosure of which is herein expressly incorporated by reference.

BACKGROUND AND SUMMARY OF THE INVENTION

The invention relates to a pump assembly having a barrel casing, a plug-in unit arranged at least in part in the barrel casing, wherein the plug-in unit comprises a shaft that is arranged so as to be rotatable about an axis of rotation by a drive, and at least two pressure stages, each having a pressure stage casing, an impeller arranged on the shaft and enclosed by the pressure stage casing in each pressure stage, and a seal that separates a first pressure chamber from a second pressure chamber.

A centrifugal pump assembly of this kind, which is also known as a double casing or barrel casing pump, is disclosed in DE 199 27 135 A1, for example.

With this kind of centrifugal pump, the centrifugal pump is enclosed by a barrel-like casing. The barrel casing which is provided with suction and pressure nozzles, and optionally with intermediate discharge points, is closed by a cover in a plane perpendicular to the shaft. These are usually multistage pumps for use as high-pressure and ultra-high-pressure pumps, in particular also as boiler feed pumps. A plurality of pressure stage casings are arranged within the barrel casing behind one another in series in the axial direction. Each pressure stage comprises a pump impeller and, optionally, a stationary stator.

The individual pressure stage casings of each pressure stage are usually formed together with the pump shaft as a cohesive pump plug-in unit. The flow transition from the last stator, or the last pressure stage casing, into the pressure nozzle usually takes place via a formed flow space in the barrel casing or via a separate plug-in unit for an end coil in the transition region.

Feed pumps often have multiple pressure regions within the outwardly recognizable barrel casing which constitutes the pressure casing. Insofar as the pressure regions abut one another, they must be sealed relative to one another in all possible operating modes, i.e. under all loads that occur. This is usually achieved with the help of special static seals. However, during operation, i.e. under load, the installation space provided for these seals is subject to deformation or displacement compared with the load-free state, which puts severe stress on the seal and can cause it to become less reliable in its sealing function.

The invention is therefore based on the object of providing a generic pump assembly which eliminates the cause of this sealing problem resulting in excessive differential deformation of the components enclosing the seal.

This object is achieved by a pump assembly according to the features of claim 1. Advantageous embodiments of the centrifugal pump are the subject matter of the dependent claims.

According to the invention, it is proposed that the pressure stage casing comprises a first part and a second part, wherein the first part has a first region having an enlarged inner diameter and a second region having a reduced inner diameter, the second part has at least one first portion having a reduced outer diameter and a second portion having an enlarged outer diameter, and the first region of the first part encloses the first portion and at least in part encloses the second portion of the second part, in such a manner that an annular chamber is formed between the first part and the second part.

The fact that the outer diameter of the second portion of the annular disc-like part and the inner diameter of the first region of the sleeve-like part are advantageously formed at their overlapping regions, in such a manner that the first region is spaced apart from the second portion with very little play or comes to bear against it, prevents or limits a deformation of the first region of the sleeve-like part inwardly or in the direction of the axis of rotation.

The second portion of the annular disk-like part advantageously has means for connecting the annular chamber to the second pressure chamber.

According to the invention, it is proposed that the second portion of the second part has a barrel surface, in which at least one groove is provided which is connected to the annular chamber or is directly attached to the annular chamber.

In a further advantageous embodiment, the annular disk-like part has a third portion abutting the second portion of the second part, wherein at least one axial groove extending in the outer barrel surface of the third portion parallel to the axis of rotation which forms a channel with the barrel casing, or at least one axial bore extending parallel to the axis of rotation close to the outer barrel surface is formed, wherein the axial groove or the axial bore opens into the second pressure chamber.

A radially circumferential gap is advantageously provided at the transition from the second portion to the third portion, which gap is connected, on the one hand, to the at least one groove and, on the other hand, to the at least one axial groove extending in the outer barrel surface of the third portion or to the at least one axial bore.

In an advantageous alternative embodiment, the second part has at least one axial bore which extends substantially parallel to the axis of rotation and which connects the annular chamber directly to the second pressure chamber.

Other objects, advantages and novel features of the present invention will become apparent from the following detailed description of one or more preferred embodiments when considered in conjunction with the accompanying drawings.

DETAILED DESCRIPTION

Figure 1:
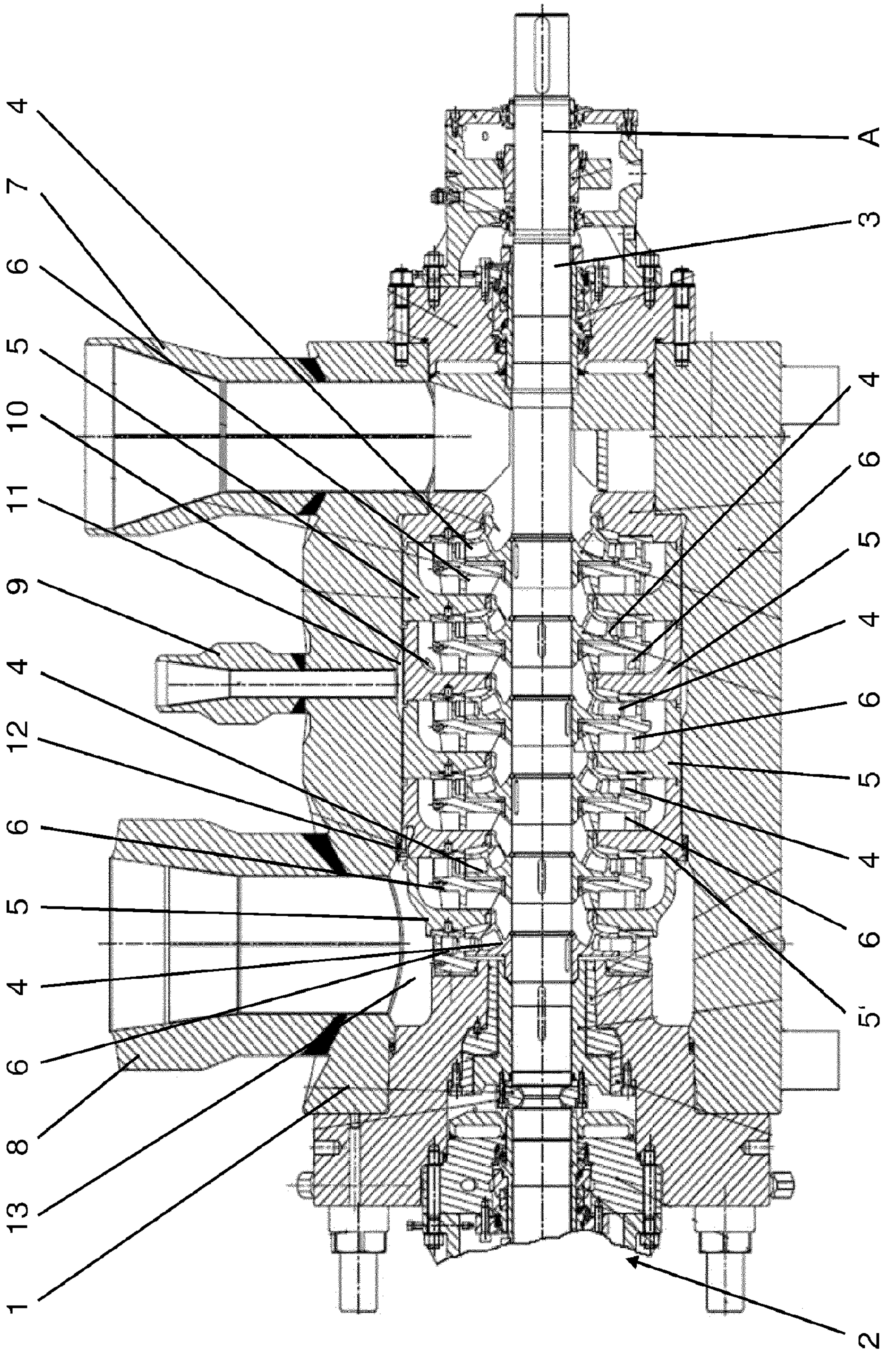
FIG. 1 shows the partial view of a pump assembly in section with a first embodiment of the pressure stage casing according to an embodiment of the invention.

FIG. 1 shows a pump assembly with a barrel casing 1 designed as a centrifugal pump. A plug-in unit 2 is arranged at least in part in the barrel casing 1. The plug-in unit 2 comprises a shaft 3 that is arranged so as to be rotatable about an axis of rotation A by a drive, e.g. an electric motor, which is not depicted. In the exemplary embodiment shown, a plurality of impellers 4 are arranged one behind the other on the shaft 3. In the exemplary embodiment, the impellers 4 are radial wheels.

The plug-in unit 2 further comprises multiple so-called pressure stage casings 5, wherein the pressure stage casing according to the invention is labelled 5'. Each impeller 4 is enclosed by a pressure stage casing 5 or 5'. Adjacent pressure stage casings 5, 5' abut one another. In the exemplary embodiment, the parting line between the pressure stage casings 5, 5' provides a metal seal.

A stator 6 arranged behind the respective impeller 4 in the direction of flow of the medium being conveyed is provided in each pressure stage casing 5, 5'. The stator 6 is connected to the pressure stage casing 5, 5' in a non-rotatable manner by means of an interference fit or another suitable means. A suction nozzle 7 through which the operating medium enters the centrifugal pump is molded on the barrel casing 1. The operating medium leaves the pump assembly via a pressure nozzle 8. In the exemplary embodiment shown, the barrel casing 1 has an intermediate discharge 9. Via at least one radial opening 10 in one of the central pressure stage casings 5, a certain proportion of the conveyed medium can be conveyed into a first pressure chamber 11, which is arranged between the pressure stage casings 5, 5' and the barrel casing 1, and discharged via the intermediate discharge 9. A seal 12 separates the pressure chamber 11 from a second pressure chamber 13 close to the pressure nozzle 8, in particular below in an inflowing region to the pressure nozzle 8, or in the inside of the pressure nozzle 8. The pressure in the second pressure chamber 13 in this case is higher at least by the pressure of a stage than the pressure prevailing in the pressure chamber 11, up to n−1 times the stage pressure, where n stands for the number of stages.

FIG. 1 shows a multistage pump assembly with six pressure stages and five pressure stage casings 5, 5'. It is self-evident that the number of pressure stages must be at least two, otherwise it can vary arbitrarily. Furthermore, it is conceivable for all pressure stages to be formed by means of pressure stage casings 5' according to the invention.

Figure 2:
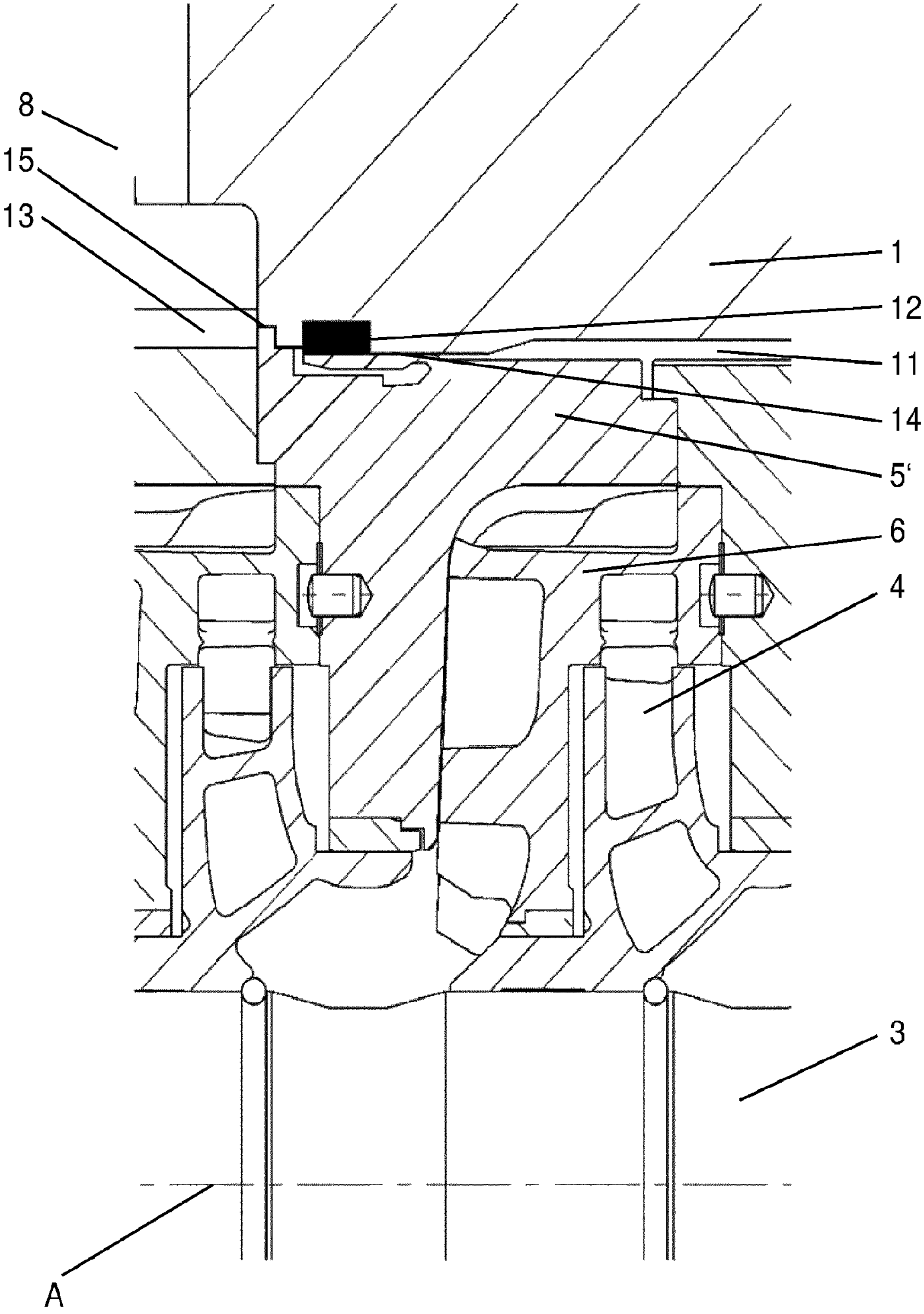
FIG. 2 shows an enlarged detail from FIG. 1.

As can be seen from FIG. 2, which shows an enlarged detail from FIG. 1, the seal 12 separates the pressure chamber 11, which tapers in the direction of the seal 12 to a relatively narrow first annular gap 14, from a channel 15 which communicates with the second pressure chamber 13 in the region of the pressure nozzle 8. FIG. 2 also shows how the seal 12 interacts with the barrel casing 1 and the pressure stage casing 5' according to the invention, and the arrangement of the stator 6 and the arrangement of the impeller 4 placed on the shaft 3 rotating about the axis of rotation A within the pressure stage casing 5'.

Figure 3:
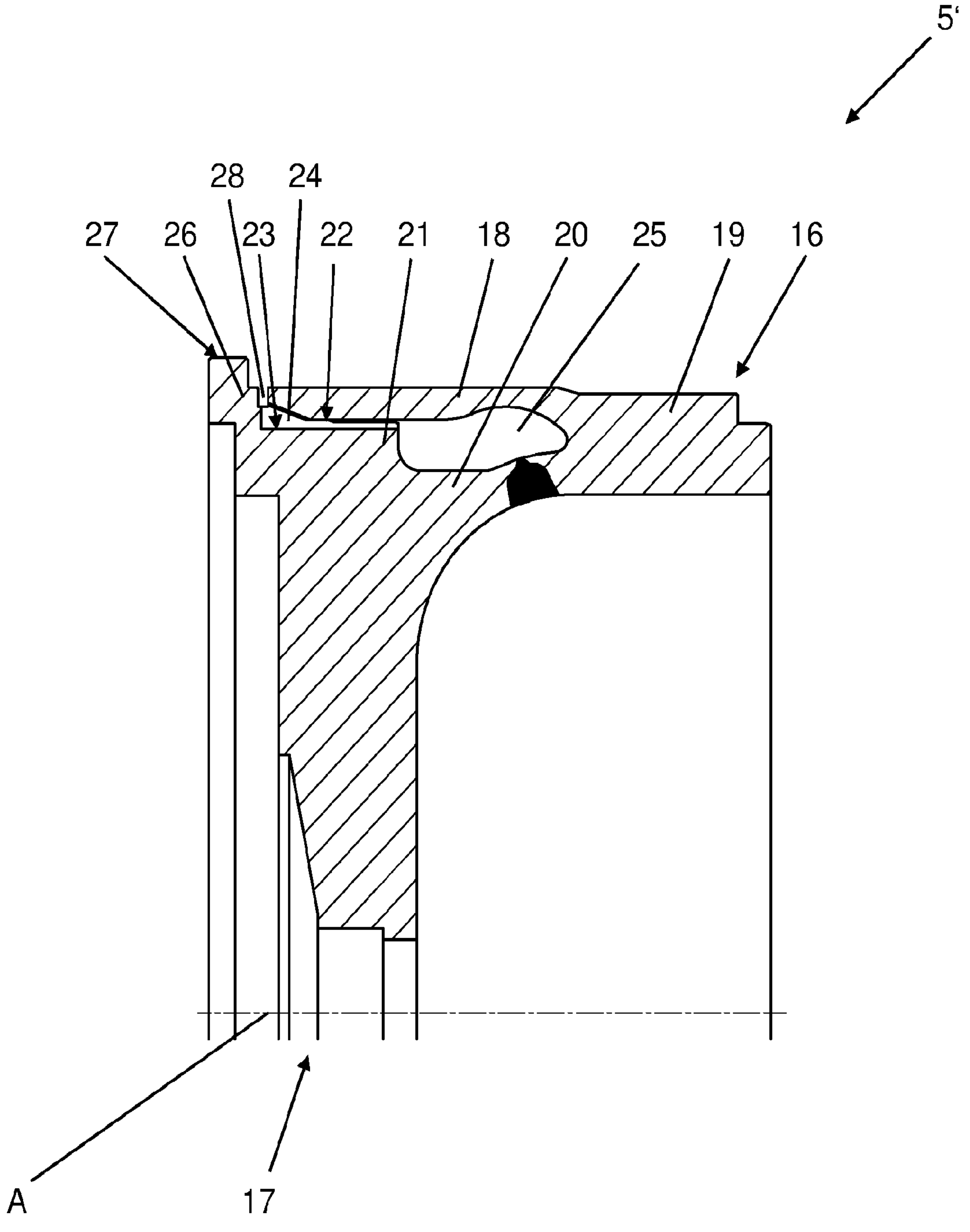
FIG. 3 shows the partial view in section of a stage casing according to the invention in the embodiment according to FIG. 1 and FIG. 2.

FIG. 3 shows a separate depiction of the cup-shaped or pot-shaped pressure stage casing 5' according to FIG. 2. The pressure stage casing 5' comprises a sleeve-like first part 16 and an annular disk-like second part 17. The sleeve-like first part 16 has a first region 18 with an enlarged inner diameter and a second region 19 with a reduced inner diameter.

At the transition from the first region 18 to the second region 19 of the sleeve-like first part 16, the sleeve-like part 16 is connected to the annular disc-like second part 17. The two parts 16 and 17 may be welded to one another or manufactured in one piece, for example by means of 3D printing. In a further alternative, the parts 16 and 17 can be screwed to one another.

The annular disk-like part 17 has a first portion 20 and a second portion 21 with a barrel surface 22. In the exemplary embodiment shown, the barrel surface 22 is substantially cylindrical in design, but also has a conical portion. At least one groove 23 is provided in the barrel surface 22, through which the portion 21 exhibits depressions and elevations 24 with the barrel surface 22. In the exemplary embodiment shown, the at least one groove 23 runs substantially parallel to the axis of rotation A.

The first region 18 of the sleeve-like part 16 encloses both the first portion 20 and in part also the second portion 21 of the annular disc-like second part 17. The outer diameter of the first portion 20 is smaller than the outer diameter of the second portion 21. The outer diameter of the second portion 21 of the annular disc-like part 17 and the inner diameter of the first region 18 of the sleeve-like part 16 are formed at their overlapping regions in such a way that the first region 18 is spaced apart from the second portion 21 with very little play or comes to bear against it.

Due to the fact that the first portion 20 of the annular disk-like second part 17 has a smaller outer diameter by comparison with the second portion 21, an annular chamber 25 is created there between the sleeve-like first part 16 and the annular disk-like part 17. The annular chamber 25 is connected to the at least one groove 23 or is attached to the groove 23 in a fluidically direct manner. The first region 18 of the sleeve-like part 16 is formed elastically within certain limits by the annular chamber 25.

The barrel surface 22 of the elevations 24 prevents or limits a deformation of the elastic region 18 of the sleeve-like part 16 inwardly or in the direction of the axis of rotation A.

The part 17 furthermore has a third portion 26 adjoining the second portion 21 on the side facing away from the annular chamber 25.

The outer diameter of the second portion 21 is smaller than the outer diameter of the third portion 26. In the embodiment shown by way of example, the third portion 26 has a step which may be provided, where necessary, for fastening the pressure stage casing 5' to the barrel casing.

The channel 15 shown in FIG. 2 is formed by at least one axial groove (not shown) extending in the axial direction in the outer barrel surface 27 of the third portion 26, which axial groove interacts with the barrel casing 1, wherein a radial connecting groove (not shown) is provided in the region of the step, which connecting groove connects the two axial groove portions in the outer barrel surface 27 to one another. Alternatively, the axial grooves and the connecting groove may also be formed in the barrel casing 1.

Since the first region 18 of the sleeve-like part 16 does not completely enclose the second portion 21, a radially circumferential gap 28, which is connected to the at least one groove 23, is produced at the transition from the second portion 21 to the third portion 26. The gap 28 furthermore communicates with the axial groove extending in the axial direction in the outer barrel surface 27 of the third portion 26 and therefore with the channel 15 shown in FIG. 2 and the pressure chamber 13.

A chamfer is provided at the transition from the first region 18 to the second region 19 of the sleeve-like first part 16, i.e. the outer diameter of the sleeve-like part 18 is greater than the outer diameter of the region 19, meaning that the seal 12 can be assembled without any problems.

Figure 4:
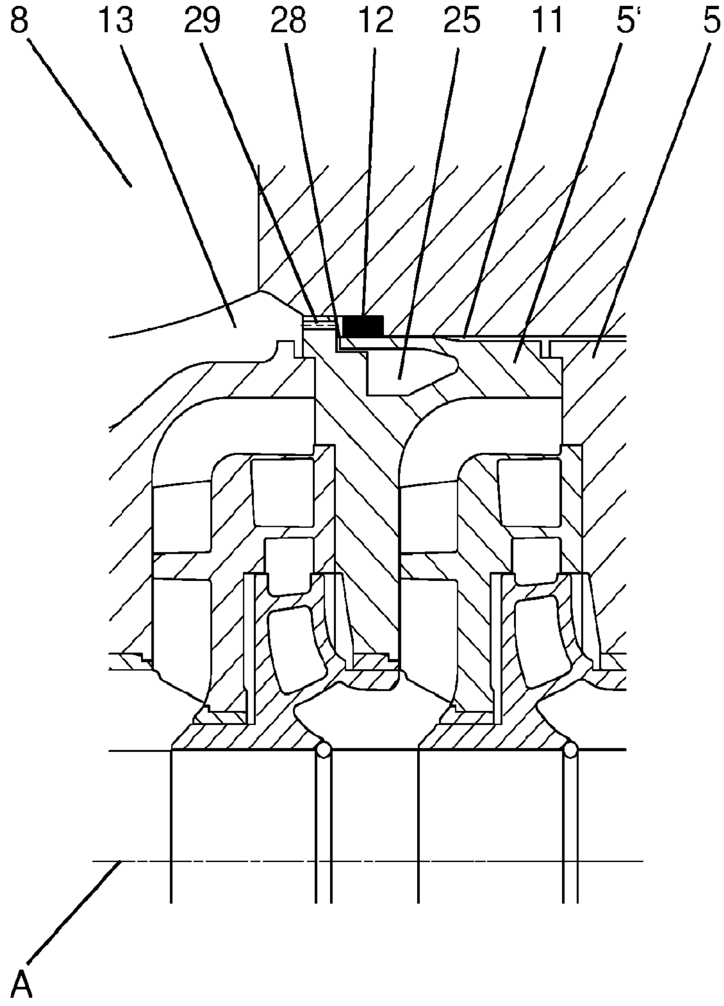
FIG. 4 shows the partial view of a second embodiment of the stage casing according to the invention in section in the installed state.

FIG. 4 shows a further embodiment of the pressure stage casing 5' according to the invention in the installed state.

Figure 5:
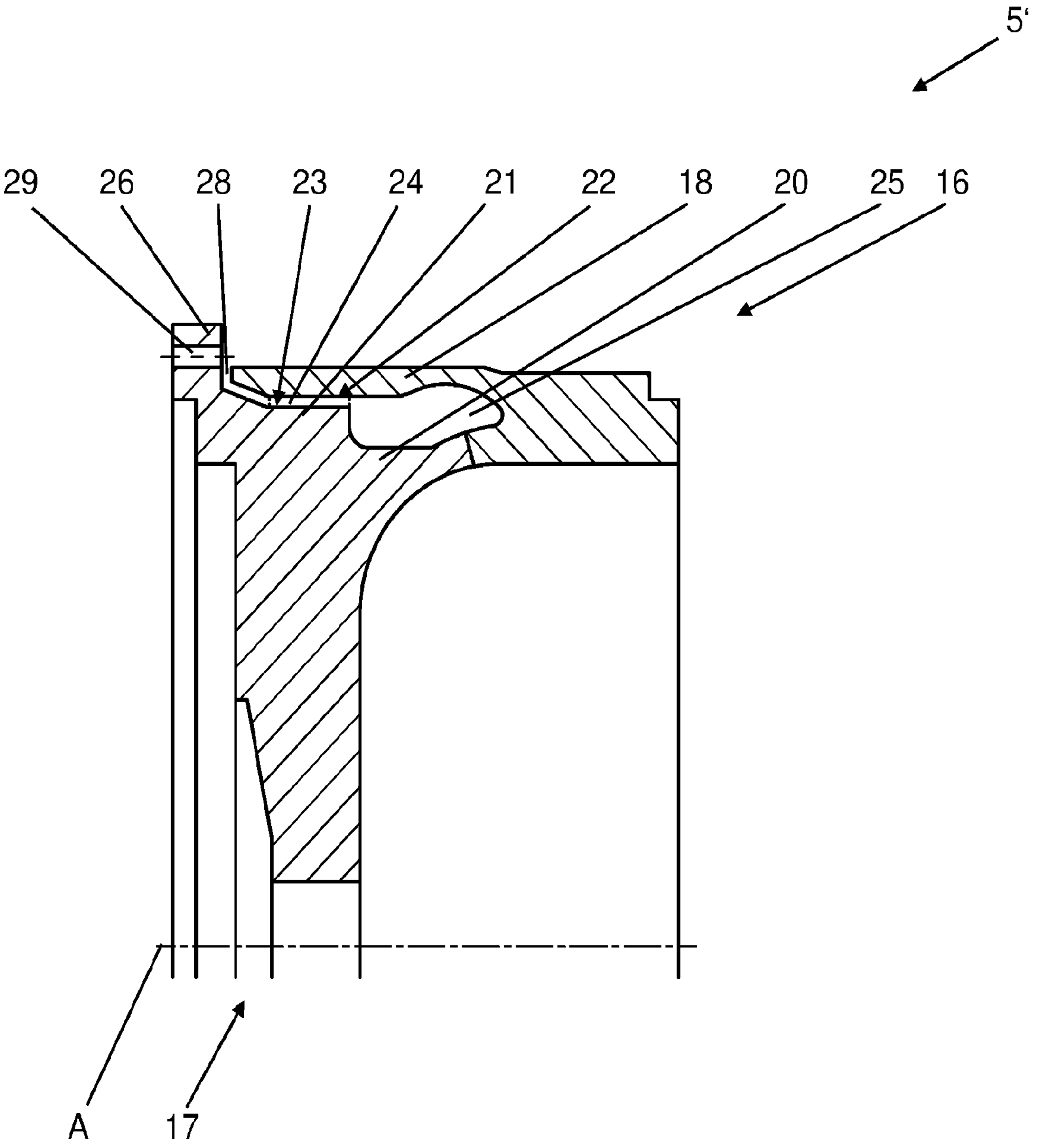
FIG. 5 shows the partial view of the stage casing according to FIG. 4 in section.

FIG. 5 shows the pressure stage casing 5' depicted in FIG. 4 in detail. The first sleeve-like part 16 substantially corresponds to the embodiment of the pressure stage casing 5' depicted in FIGS. 1 to 3 and requires no further explanation. The second portion 21 of the second part 17 with the at least one groove 23 and the at least one elevation 24 and the barrel surface 22 and also the annular chamber 25 substantially correspond to the embodiments described with reference to FIGS. 1 to 4.

In the embodiment of the pressure stage casing 5' shown in FIG. 4 and FIG. 5, at least one axial bore 29 formed substantially parallel to the axis of rotation A is provided in the third portion 26 and communicates with the gap 28 and opens into the second pressure chamber 13 in the region of the pressure nozzle 8.

In the embodiment shown, no step is provided in portion 26, but it may be provided with a step, as shown in FIGS. 2 and 3.

Figure 6:
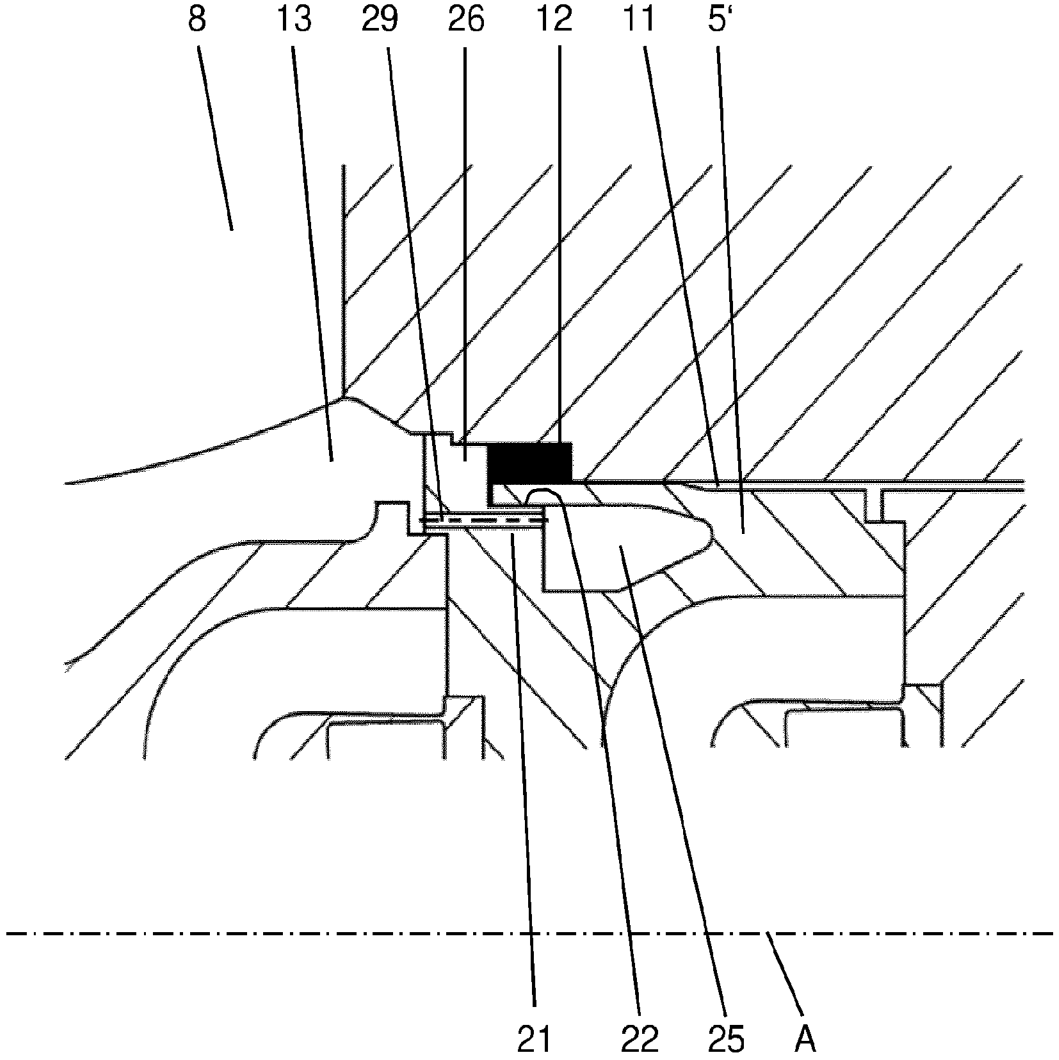
FIG. 6 shows the partial view of a third embodiment of the stage casing according to the invention in section in the installed state.

As shown in FIG. 6, in a further embodiment of the pressure stage casing 5', the at least one axial bore 29 can be connected to, or directly attached to, the annular chamber 25 and extend through the second portion 21 and the third portion 26 and open into the second pressure chamber 13. The axial bore 29 therefore directly connects the annular chamber 25 to the second pressure chamber 13 in the region of the pressure nozzle 8. Grooves in the barrel surface 22 can be dispensed with in this case.

In the embodiment shown by way of example, the third portion 26 has a step which is not needed, however, with a fastening type of the pressure stage casing 5', as is shown in FIGS. 4 and 5.

When the pump assembly is put into operation, medium is sucked into the pump via the suction nozzle 7 and flows to the pressure stage casing 5 which is connected downstream of the suction nozzle as the first. The medium is guided to the next pressure stage casing 5 by means of the impeller 4 via the stator 6 which is connected afterwards or arranged downstream. A part of the medium is conveyed into the pressure chamber 11 via the at least one opening 10 in the stage casing 5 which is closest to the intermediate discharge 9, from where it can be conveyed from the pump via the intermediate discharge 9. The majority of the medium is supplied in a corresponding manner to the next pressure stage casings 5.

The last stator 6, viewed in terms of flow, conveys the medium into the pressure chamber 13. From there, part of the medium according to FIGS. 1 to 3 passes via the at least one channel 15 and the radially circumferential gap 28 into the at least one groove 23 in the second portion 21 and then into the annular chamber 25 or, according to FIGS. 4 and 5, via the at least one axial bore 29 and the radially circumferential gap 28 into the at least one groove 23 and then into the annular chamber 25 or according to FIG. 6 directly via the at least one axial bore 29 from the pressure chamber 13 into the annular chamber 25. The pressure chamber 13 forms a medium-filled system of communicating spaces with the at least one channel 15 or the at least one axial bore 29, the radially circumferential gap 28, the at least one groove 26 and the adjoining annular chamber 25.

In the annular chamber 25 there is an overpressure relative to the chamber 11 which expands the region 18 and thereby rests against the barrel casing radially. As a result, the radial extent of the sealing space remains virtually constant under all operating conditions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A pump assembly having a barrel casing; and a plug-in unit arranged at least in part in the barrel casing, the plug-in unit including a shaft rotatable about an axis of rotation and at least two pressure stages, wherein each of the at least two pressure stages includes a pressure stage casing, an impeller arranged on the shaft and enclosed by the pressure stage casing, and a seal that separates a first pressure chamber of a first one of the at least two pressure chambers from a second pressure chamber of a second one of the at least two pressure chambers, the pressure stage casing of at least one of the at least two pressure stages includes a first casing part and a second casing part, the first casing part has a first region having an enlarged inner diameter and a second region, downstream of the first region along an axis of rotation, having a reduced inner diameter, the second casing part has at least one first portion having a reduced outer diameter and a second portion having an enlarged outer diameter, the first region of the first casing part encloses the first portion of the second casing part and at least in part encloses the second portion of the second casing part such that an annular chamber is formed between the first casing part and the second casing part and the annular chamber is connected to the second pressure chamber, the first region of the first casing part has a sleeve shape, the second casing part has an annular disc shape, and the outer diameter of the second portion of the annular disc-shaped second casing part and the inner diameter of the first region of the sleeve shaped first casing part are formed at their overlapping regions such that the first region of the first casing part bears against or is spaced apart from the second portion of the second casing part.

2. The pump assembly as claimed in claim 1, wherein the first region of the sleeve-shaped first casing part is configured to connect the annular chamber to the second pressure chamber.

3. The pump assembly as claimed in claim 2, wherein the second portion of the second casing part has a barrel surface having at least one groove connected to the annular chamber.

4. The pump assembly as claimed in claim 2, wherein the first region of the sleeve-shaped first casing part has a third portion axially adjacent to the second portion of the annular disc-shaped second casing part, and one or more of at least one axial groove and at least one axial bore extends parallel to the axis of rotation, the at least one axial groove being arranged in an outer barrel surface of the third portion and communicating with the second pressure chamber, and at least one axial bore being arranged adjacent to the outer barrel surface of the third portion and communicating with the second pressure chamber.

5. The pump assembly as claimed in claim 3, wherein the first region of the sleeve-shaped first casing part has a third portion axially adjacent to the second portion of the annular disc-shaped second casing part, and one or more of at least one axial groove and at least one axial bore extends parallel to the axis of rotation, the at least one axial groove being arranged in an outer barrel surface of the third portion and communicating with the second pressure chamber, and at least one axial bore being arranged adjacent to the outer barrel surface of the third portion and communicating with the second pressure chamber.

6. The pump assembly as claimed in claim 4, wherein the at least one axial groove is present, and a radially circumferential gap at a transition from the second portion of the second casing part to the third portion of the first casing part is connected to the at least one axial groove extending in the outer barrel surface of the third portion of the first casing part.

7. The pump assembly as claimed in claim 4, wherein the at least one axial bore is present, and a radially circumferential gap at a transition from the second portion of the second casing part to the third portion of the first casing part is connected to the at least one axial bore extending in the outer barrel surface of the third portion of the first casing part.

8. The pump assembly as claimed in claim 5, wherein the at least one axial groove is present, and a radially circumferential gap at a transition from the second portion of the second casing part to the third portion of the first casing part is connected to the at least one axial groove extending in the outer barrel surface of the third portion of the first casing part.

9. The pump assembly as claimed in claim 5, wherein the at least one axial bore is present, and a radially circumferential gap at a transition from the second portion of the second casing part to the third portion of the first casing part is connected to the at least one axial bore extending in the outer barrel surface of the third portion of the first casing part.

10. The pump assembly as claimed in claim 1, wherein the first casing part has an axial bore which connects the annular chamber directly to the second pressure chamber.

11. The pump assembly as claimed in claim 2, wherein the first casing part has an axial bore which connects the annular chamber directly to the second pressure chamber.

12. The pump assembly as claimed in claim 3, wherein the first casing part has an axial bore which connects the annular chamber directly to the second pressure chamber.

* * * * *